United States Patent
Plague

(10) Patent No.: US 10,875,611 B2
(45) Date of Patent: Dec. 29, 2020

(54) FLEXIBLE COVERING ITEM

(71) Applicant: GUARDTEX, Sarzeau (FR)

(72) Inventor: Thierry Plague, Sarzeau (FR)

(73) Assignee: SELLERIE NAUTIQUE AEREC, Sarzeau (FR)

( * ) Notice: Subject to any disclaimer, the term of this patent is extended or adjusted under 35 U.S.C. 154(b) by 0 days.

(21) Appl. No.: 16/611,119

(22) PCT Filed: May 4, 2018

(86) PCT No.: PCT/FR2018/051139
§ 371 (c)(1),
(2) Date: Nov. 5, 2019

(87) PCT Pub. No.: WO2018/206892
PCT Pub. Date: Nov. 15, 2018

(65) Prior Publication Data
US 2020/0189696 A1    Jun. 18, 2020

(30) Foreign Application Priority Data
May 11, 2017  (FR) ..................... 17 54144

(51) Int. Cl.
*B63B 45/04* (2006.01)
*B63B 17/02* (2006.01)
*F21V 8/00* (2006.01)

(52) U.S. Cl.
CPC .............. *B63B 45/04* (2013.01); *B63B 17/02* (2013.01); *G02B 6/001* (2013.01); *G02B 6/0006* (2013.01)

(58) Field of Classification Search
CPC ....... B63B 45/04; B63B 17/02; G02B 6/0006; G02B 6/001; G02B 6/00
See application file for complete search history.

(56) References Cited

U.S. PATENT DOCUMENTS

| 5,911,500 A * | 6/1999 | Barnett .............. G01N 21/8806 362/145 |
| 6,382,825 B1 | 5/2002 | Wainwright |
| 9,335,457 B2 * | 5/2016 | Zimmermann ........ D03D 11/00 |

(Continued)

FOREIGN PATENT DOCUMENTS

| AT | 502591 A1 | 4/2007 |
| WO | 2008087339 A2 | 7/2008 |

OTHER PUBLICATIONS

International Search Report for corresponding PCT application No. PCT/FR2018/051139, dated Jul. 9, 2018.

*Primary Examiner* — Stephen P Avila
(74) *Attorney, Agent, or Firm* — Notaro, Michalos & Zaccaria P.C.

(57) ABSTRACT

A flexible coverage-providing article for outside use having a covering textile layer, and a woven illuminating layer having diffusing optical fibers and binding threads woven with the diffusing optical fibers. The illuminating layer furthermore containing a border composed of woven textile threads, the diffusing optical fibers extending beyond one edge of the woven illuminating layer, an end segment of the diffusing optical fibers being formed into a strand, an assembly seam, a lighting unit, the lighting unit having an optical output, the optical output being connected to the strand of diffusing optical fibers, and a light source for generating a light flux in the optical output.

10 Claims, 4 Drawing Sheets

(56) References Cited

U.S. PATENT DOCUMENTS

| | | | |
|---|---|---|---|
| 2006/0087832 A1 | 4/2006 | Peng et al. | |
| 2009/0291606 A1* | 11/2009 | Malhomme | G02B 6/001 442/301 |
| 2010/0046246 A1* | 2/2010 | Bihr | D03D 15/00 362/556 |
| 2017/0158122 A1* | 6/2017 | Haas | B60Q 3/14 |

* cited by examiner

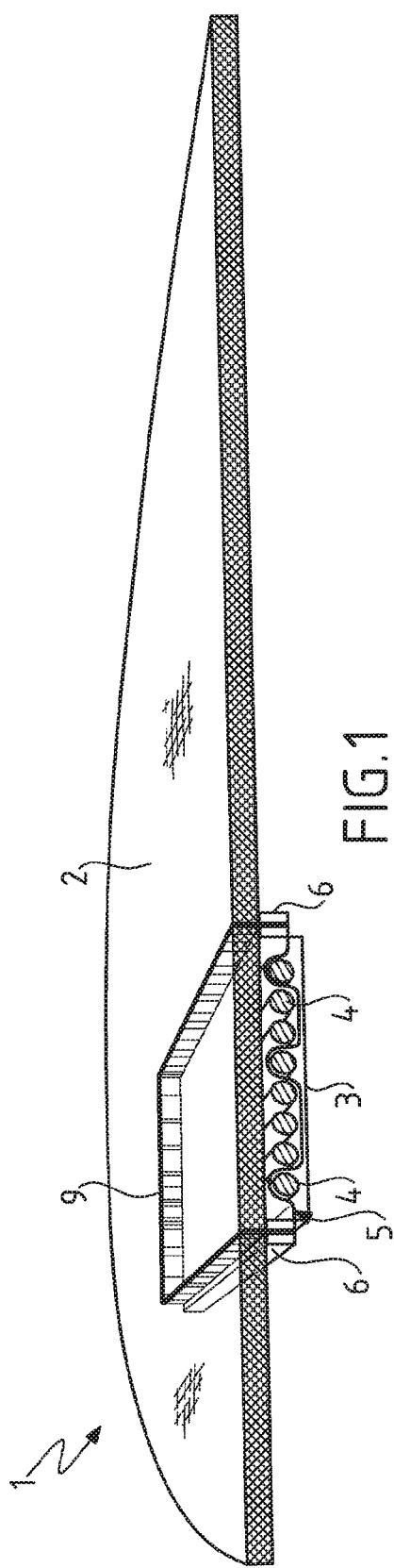
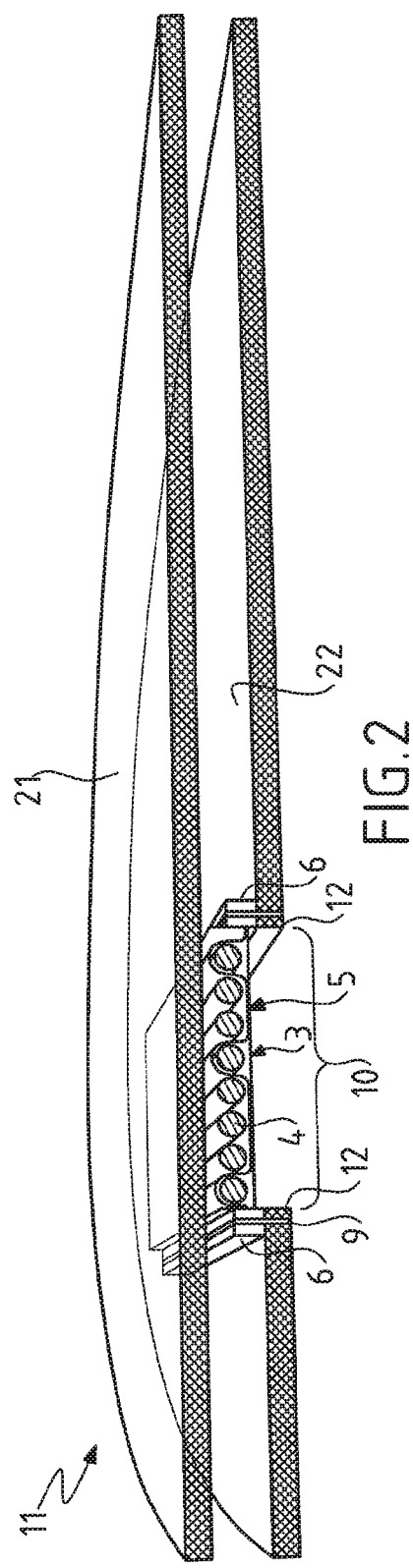

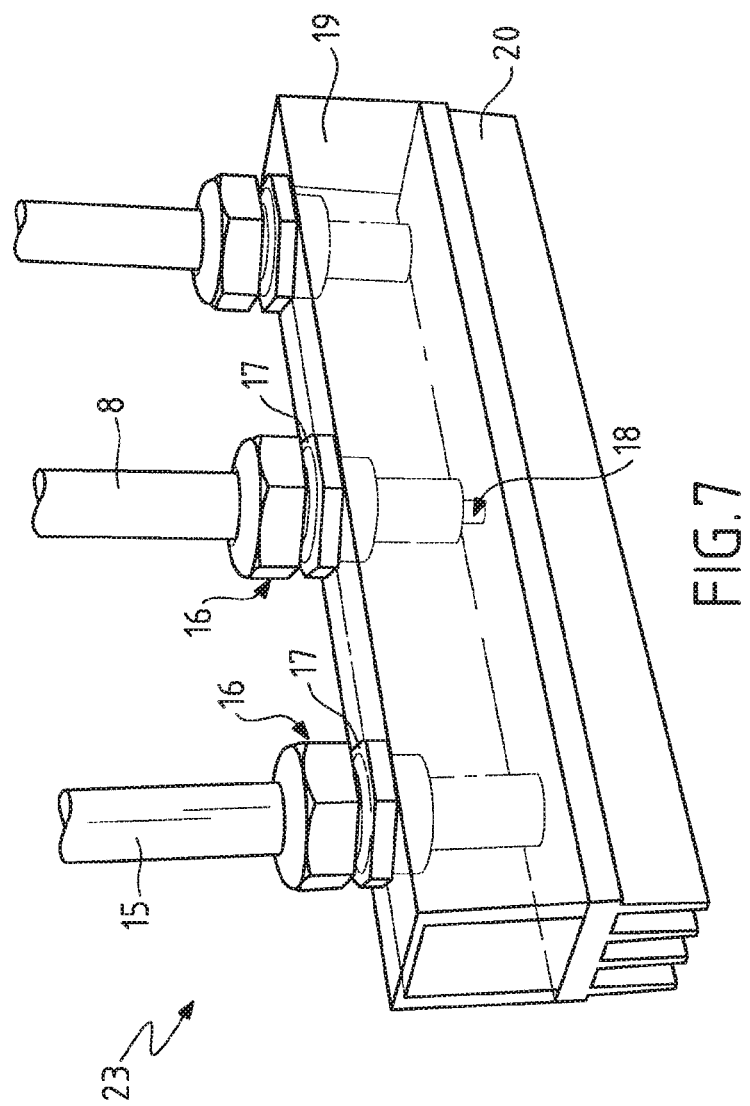

FLEXIBLE COVERING ITEM

TECHNICAL FIELD

The present invention relates to the field of flexible coverage-providing articles for outside use, and more particularly to illuminating coverage-providing articles that employ diffusing optical fibers.

The invention relates, inter alia, to coverage-providing articles used as roofs to protect users from the sun and/or bad weather, for example articles such as spray hoods, fly bridges and sun awnings, in particular for use on a marine vehicle.

TECHNOLOGICAL BACKGROUND

In the prior art, illuminating systems that employ diffusing optical fibers and that are integrated into a tent canvas are known.

U.S. Pat. No. 6,382,825 discloses an outer tent canvas, in which a group of diffusing optical fibers is held against the tent canvas by a transparent sheet that is sewn to the tent canvas.

SUMMARY

The invention aims to provide a flexible coverage-providing article incorporating an illuminating layer containing diffusing optical fibers.

To this end, according to one embodiment, the invention provides a flexible coverage-providing article for outside use, comprising:

a covering textile layer, and a woven illuminating layer comprising diffusing optical fibers and binding threads woven with the diffusing optical fibers, the illuminating layer furthermore comprising a border composed of woven textile threads, the border being placed on the perimeter of the woven illuminating layer, the diffusing optical fibers extending beyond one edge of the woven illuminating layer, an end segment of the diffusing optical fibers being formed into a strand, an assembly seam, the woven illuminating layer being fastened to the covering textile layer by the assembly seam on the border, the two layers being taut, a lighting unit, the lighting unit comprising an optical output, the optical output being connected to the strand of diffusing optical fibers, and a light source for generating a light flux in the optical output.

By virtue of these features, the cohesion of the diffusing optical fibers with respect to one another is improved during handling of the flexible coverage-providing article, for example during folding, unfolding, rolling or unrolling.

By virtue of these features, the resistance of the flexible coverage-providing article to mechanical strains and laceration is improved.

According to other advantageous embodiments, such an illuminating coverage-providing article may have one or more of the following features:

Light sources of various colors may be used depending on the envisioned application. For example, various colors may be used in order not to decrease vision when navigating at night and/or for the purposes of signaling and/or communication.

In one embodiment, the light source is a light-emitting diode (LED) and the lighting unit furthermore comprises a lens able to focus the light emitted in by the LED into the end of the diffusing optical fibers.

In one embodiment, the focal plane, the lighting unit furthermore comprises an electrical connector able to receive electricity and to supply the LED with power.

In one embodiment, the lighting unit is furthermore able to be connected to a radiator. By virtue of these features, the heat from the LED may be dispersed.

In one embodiment, the casing is water-tight.

In one embodiment, the diffusing optical fibers are parallel to one another, so that the woven illuminating layer is substantially flat. By virtue of these features the flexibility of a flexible coverage-providing article is improved because the diffusing optical fibers are substantially in the same thickness.

In one embodiment, the binding threads are made of polyester.

In one embodiment, the binding threads are woven at a right angle with respect to the diffusing optical fibers, so as to form a warp-and-weft type weave.

In one embodiment, the assembly seam is welded, for example by cold welding. By virtue of these features, the covering textile layer is water resistant even level with the assembly seam.

In one embodiment, the thickness of the border is substantially 0.2 mm.

In one embodiment, the width of the border is substantially 20 mm. By virtue of these features, the end of the diffusing optical fibers is not damaged during the production of the assembly seam.

In one embodiment, the thickness of the covering textile layer is substantially 0.8 mm.

In one embodiment, the diameter of the optical fiber is substantially 0.5 mm. This diameter is that measured around the cladding.

In one embodiment, the dimensions may for example be measured by caliper rule.

In one embodiment, the flexible coverage-providing article furthermore comprises a sleeve, the strand being assembled in the sleeve at the end of the strand, the sleeve being able to receive the light flux generated in the optical output on the end of the diffusing optical fibers.

In one embodiment, the sleeve is of substantially cylindrical shape. In one embodiment, the sleeve is made of aluminum.

In one embodiment, the light source is a light-emitting diode (LED) and the lighting unit furthermore comprises a lens able to focus the light emitted in by the LED onto the end of the diffusing optical fibers.

In one embodiment, the focal plane, the lighting unit furthermore comprises an electrical connector able to receive electricity and to supply the LED with power.

In one embodiment, the covering textile layer is coated on one face so as to be water resistant, the woven illuminating layer being sewn to the other face.

In one embodiment, the coating comprises a water-resistant resin. In one embodiment, the coating has antifungal properties.

In one embodiment, the textile layer comprises fibers made of acrylic. In one embodiment, the covering textile layer is 100% composed of acrylic, its weave being of canvas type, the covering textile layer weighing 320 g/m$^2$. The warp threads have a strength at break of 140 decanewtons (daN), a tear strength of 3 to 3.3 daN, and for example of 3.3 daN, and an elongation at break of 30% to 34%, and for example of 30%. The weft threads have a strength at break of 90 to 130 daN, for example of 130 daN, a tear strength of 2.5 daN and an elongation at break of 15% to 30%, and for example of 15%. The water resistance measured by the Schmerber test is 400 to 1000 mm, and for example 1000 mm. The air permeability is 2.5 $l/m^2/s$ to 31.62 $l/m^2/s$, and for example 2.5 $l/m^2/s$. The numerical values taught above may vary by 10%. For example, such a covering textile layer is sold by the group DICKSON-GLEN RAVEN, under the trade name SUNBRELLA Plus.

In one embodiment, the covering textile layer is opaque.

In one embodiment, the textile layer comprises UV-resistant textile threads.

In one embodiment, the binding threads are furthermore UV-resistant.

By virtue of these features, the woven illuminating layer is protected from attack by UV rays reflected from water or snow and entering into the cockpit formed by the flexible coverage-providing article.

In one embodiment, the electrical connector is able to receive an electrical power of 5 W.

In one embodiment, the flexible coverage-providing article is an illuminating spray-hood canvas that furthermore comprises sheaths formed along the edges of the covering textile layer, the sheaths being able to receive poles in order that the flexible coverage-providing article forms a cockpit, for example for a leisure sailing boat.

In one embodiment, the lighting unit is placed in one of the sheaves.

In one embodiment, a film is adhesively bonded or welded to the woven illuminating layer on the side opposite to the covering textile layer. By virtue of these characteristics, the diffusing optical fibers are protected from mechanical attack from the side of the interior of the cockpit.

In one embodiment, the covering textile layer is a first covering textile layer, the flexible coverage-providing article furthermore comprising a second covering textile layer placed thereabove.

In one embodiment, the first and second covering textile layers are sewn to each other on their borders, so that the assembly formed by the two covering textile layers is flat.

In one embodiment, the first textile layer has an aperture of same size as the woven illuminating layer and the edges of this aperture are sewn with the borders of the woven illuminating layer to the first textile layer.

In one embodiment, the second textile layer is water resistant. By virtue of these features, the water resistance of the flexible coverage-providing article is improved.

In one embodiment, the flexible coverage-providing article furthermore comprises a canvas segment sewn to the covering textile layer around the end of the diffusing optical fibers formed into a strand, in order that the strand be placed between the canvas segment and the covering textile layer. By virtue of these features, the end of the diffusing optical fibers formed into a strand is protected from mechanical attack.

The invention also relates to a spray hood intended for use on a marine vehicle, comprising the flexible coverage-providing article described above and poles placed at least partially in the sheaths of the flexible coverage-providing article, so that the flexible coverage-providing article is taut on the poles, the poles being able to be fastened to the marine vehicle. The poles may take the form of a rigid, foldable, demountable or inflatable structure. Such poles may be made from various materials, for example stainless steel, aluminum, composites, etc.

BRIEF DESCRIPTION OF THE FIGURES

The invention will be better understood, and other aims, details, features and advantages thereof will become more clearly apparent on reading the following description of a number of particular embodiments of the invention, which are given merely by way of nonlimiting illustration, with reference to the appended drawings:

FIG. 1 is a partial cross-sectional view of an illuminating spray hood according to a first embodiment, FIG. 2 is an exploded partial cross-sectional view of an illuminating spray hood according to a second embodiment, FIG. 7 is a schematic of a water-tight casing for the optical supply of the woven illuminating layer.

DETAILED DESCRIPTION OF EMBODIMENTS

Figure 3:
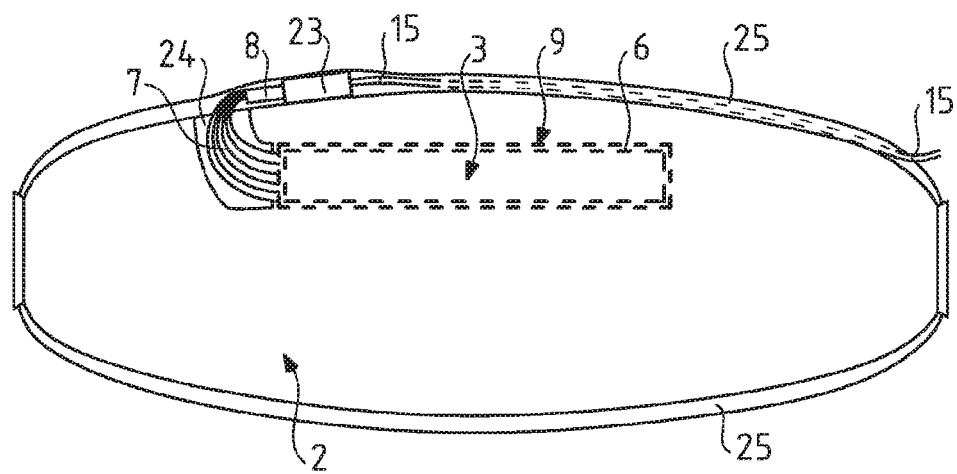
FIG. 3 is a top view of a roof segment of the illuminating spray hood of FIG. 4.

FIGS. 1 and 2 show an illuminating spray hood 1, 11 according to 2 embodiments. In the two embodiments, the illuminating spray hood 1 comprises a woven illuminating layer 3.

The woven illuminating layer 3 is flat and of rectangular shape.

The illuminating spray hood 1, 11 and the woven illuminating layer 3 are flexible.

FIG. 1 shows a first embodiment in which the illuminating spray hood 1 comprises a single covering textile layer 2 to which the woven illuminating layer 3 is sewn.

The woven illuminating layer 3 comprises diffusing optical fibers 4. The diffusing optical fibers 4 are plastic wires covered with a cladding made of plastic of different refractive index allowing light that is introduced thereinto to be transmitted via internal reflections from the interface between the cladding and the plastic wire. The cladding is diffusing, for example because it comprises periodic apertures, in order that the light be able to diffuse radially all along the diffusing optical fiber 4. The diffusing optical fibers are selected to diffuse light in the visible domain.

Figure 5:
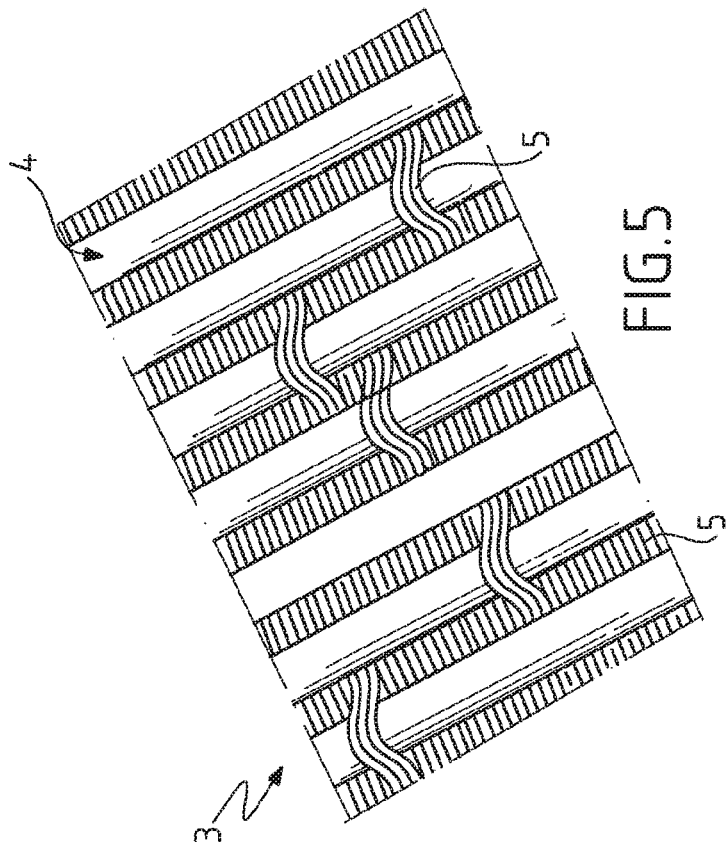
FIG. 5 is a schematic of a woven illuminating layer segment able to be used in an illuminating spray hood such as that of FIG. 1 or of FIG. 2.

FIG. 5 illustrates in more detail a form of weaving usable in the woven illuminating layer 3.

The diffusing optical fibers 4 are parallel to one another. The diffusing optical fibers 4 are not superposed with one another in the woven illuminating layer 3. Thus, the diffusing optical fibers 4 together form a flexible planar layer of rectangular shape. In particular, a width of the woven illuminating layer 3 corresponds to a first end of the diffusing optical fibers 4, and the two lengths of the woven illuminating layer 3 correspond to the outline along the first and last diffusing optical fiber 4 of the woven illuminating layer 3, respectively. The last width of the woven illuminating layer 3 corresponds to a second end of the diffusing optical fibers 4, this second end being free and not woven.

The woven illuminating layer 3 furthermore comprises binding threads 5. The diffusing optical fibers 4 are woven together by way of the binding threads 5, for example via a jacquard weave. The binding threads 5 may be cotton threads or synthetic threads. The function of the binding threads 5 is to keep the diffusing optical fibers 4 parallel to one another so as to form the textile planar layer. Preferably, the binding threads 5 are made of polyester that has been treated in order to be resistant to ultraviolet (UV) rays.

Figure 6:
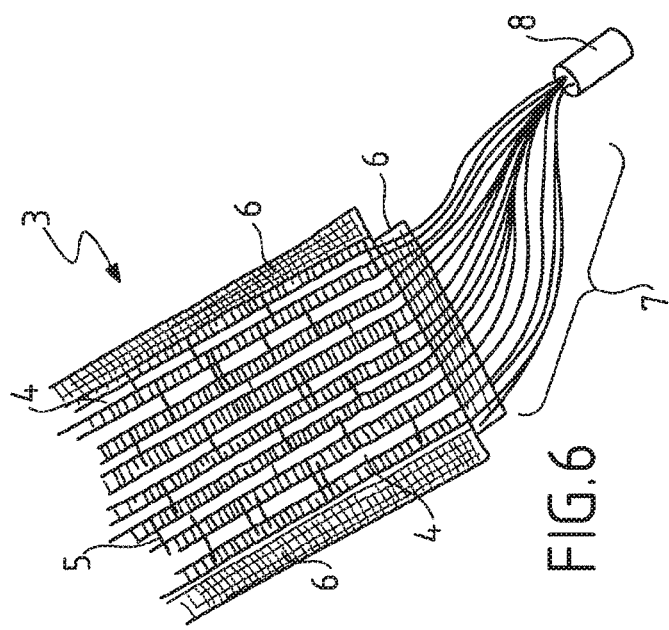
FIG. 6 is a schematic of a woven illuminating layer the diffusing optical fibers of which are formed into a strand.

FIG. 6 illustrates in more detail one embodiment of the woven illuminating layer 3.

The edges of the woven illuminating layer 3 are borders 6 that are woven solely with binding threads 5, and that comprise no diffusing optical fibers 4 in order to be able to be sewn without running the risk of cutting through a diffusing optical fiber 4. The borders 6 are woven on each width and each length of the rectangular shape of the woven illuminating layer 3.

In particular, level with the width corresponding to the second end of the diffusing optical fibers 4, the border 6 and the non-woven diffusing optical fibers 4 are in two separate thicknesses. One of the two thicknesses is that of the non-woven diffusing optical fibers 4 exiting from the woven illuminating layer 3. The other is the thickness of the border 6. Thus, the two separate thicknesses may be moved apart from each other while an assembly seam 9 is produced on the border 6. As shown, the second ends of the diffusing optical fibers 4, which are free level with the width corresponding to the second end of the diffusing optical fibers 4, are formed into a strand 7 of diffusing optical fibers 4. The strand 7 is held by a sleeve 8. The sleeve 8 is a cylinder that is open at its two ends and that has a diameter suitable for holding the strand 7. The second end of the diffusing optical fibers 4 is organized about a radial plane of the sleeve 8.

The sleeve 8 is arranged in a lighting unit 23 in particular comprising a light source, and supplied with power via an electrical power cable 15, as described below with reference to FIG. 7.

FIG. 3 shows a roof segment 200 of the illuminating spray hood 1, when this segment is placed flat before the assembly of the illuminating spray hood 1.

As shown in FIG. 3, the woven illuminating layer 3 is fastened to the covering textile layer 2 via an assembly seam 9 produced on the borders 6. The woven illuminating layer 3 is sewn taut to the covering textile layer 2 so that the assembly formed by the two layers is flat and flexible.

The illuminating spray hood 1 furthermore comprises sheaths 25 that are able to receive poles, for example metal poles, suitable for giving the flexible illuminating spray hood 1 a shape such that it may form a cockpit or a roof.

The sheaths 25 are for example produced by forming open hems by sewing edges of the covering textile layer 2. The sheaths 25 are also producible in the form of workable fabric ducts the edges of which are equipped with zips or popper buttons or hook-and-loop tapes (Velcro type) in order to facilitate the mounting and demounting of the illuminating spray hood 1 on the poles.

Optionally, the sleeve 8 is placed in a sheath 25 and the electrical power supply is an electrical power cable 15 that exits from the sheath 25, such as shown in FIG. 3. Thus, the electrical power supply is easy to access in order to be plugged in and controlled. Alternatively, the electrical power supply may be stand-alone, for example the electrical power supply may be a battery. The battery may or may not be accessible.

In the first embodiment shown with reference to FIGS. 1 and 3, the illuminating spray hood 1 furthermore comprises a covering part 24 that covers the second end of the diffusing optical fibers 4 from the border 6. This covering part 24 is sewn to the border 6 in order to protect the free ends of the diffusing optical fibers as far as to the sleeve 8.

FIG. 2 shows a second embodiment of the illuminating spray hood 11.

In this embodiment, the illuminating spray hood 11 comprises two covering textile layers 21 and 22 and a woven illuminating layer 3.

The covering textile layer 21 is intended to be placed toward the exterior of the cockpit formed by the illuminating spray hood 11. The covering textile layer 21 is intended to protect the cockpit formed by the illuminating spray hood 11 from exterior attack, and for example from rain.

The covering textile layer 22 is intended to be placed toward the interior of the cockpit formed by the illuminating spray hood 11. The covering textile layer 22 is intended to protect the second end of the diffusing optical fibers 4, instead of the covering part 24 of the first embodiment.

The covering textile layer 21 is sewn taut to the covering textile layer 22 so that the assembly formed by the two layers is flat. For example, the seams fastening the two covering textile layers are produced on the edges of the two covering textile layers 21 and 22.

The covering textile layer 22 contains a rectangular window 10 of same size as the woven illuminating layer 3 and has borders 12.

Instead of being sewn to the covering textile layer 21 as in the first embodiment, the illuminating woven layer 3 is sewn to the borders 12 of the covering textile layer 22. The borders 6 and the borders 12 are sewn via the assembly seam 9.

Thus, no stitches pass through the covering textile layer 21, this improving the resistance of the illuminating spray hood 11 with respect to rain, in particular by performing the function of second watertight covering above the cockpit.

Figure 4:
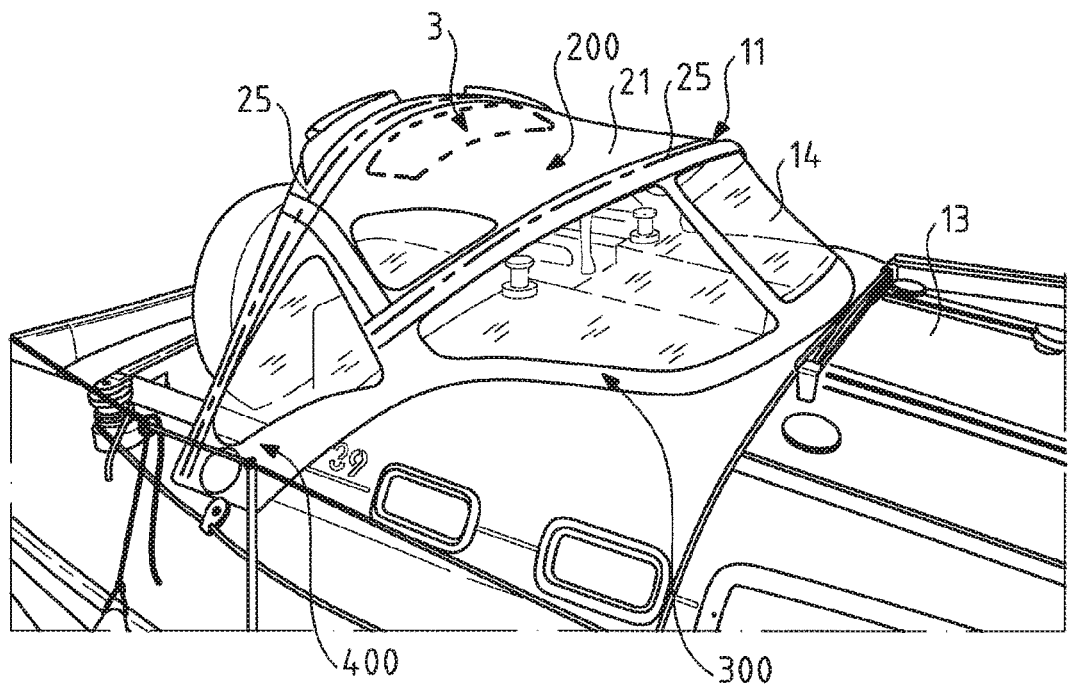
FIG. 4 is an illustration of a leisure boat on which an illuminating spray hood is installed.

FIG. 4 shows a leisure boat 13 on which an illuminating spray hood 11 is installed.

As shown, the illuminating spray hood 11 consists of an assembly of a roof segment 200 and other segments, namely a windshield 300 and side panels 400, which are sewn together via their edges, and the sheaths 25.

The illuminating spray hood 11 forms a cockpit on the deck of the leisure boat 13. The poles supporting the illuminating spray hood 11 are represented in the sheaths by dot-dashed lines. This cockpit is protected from bad weather, in particular at sea, by virtue of the illuminating spray hood 11. In particular, bad weather in a marine environment comprises the action of wind, of rain, of water spray and of the largest waves breaking on the deck.

The cockpit formed is illuminated by virtue of the woven illuminating layer 3, which is turned toward the interior of the cockpit. The woven illuminating layer 3 provides ambient lighting in the cockpit. In particular, the woven illuminating layer 3 placed on the ceiling of the cockpit acts as a ceiling light, illuminating all of the passenger compartment right down to the floor of the cockpit.

The woven illuminating layer 3 has the advantage of acting as an areal lamp, and therefore improving the uniformity of the ambient lighting.

In addition, its thickness is small, and the illuminating spray hood 11 does not exhibit a significant extra thickness level with the woven illuminating layer 3. At most, the thickness of the illuminating spray hood 11 doubles level with the woven illuminating layer 3. Since the woven illuminating layer 3 is flexible and thin, the flexibility of the illuminating spray hood 11 is maintained despite the integration of a lamp into the illuminating spray hood 11. The resulting advantage is to allow the illuminating spray hood 11 to be rolled or unrolled. For example, the illuminating spray hood 11 may be rolled in order to be stowed during wintering of the leisure boat 13 in order to increase the lifetime of the illuminating spray hood 11.

The illuminating spray hood 11 also contains transparent windows 14, which are for example made of a transparent supple plastic that is welded to the windows cut in the textile layers 21 and 22. The illuminating spray hood 11 forms a canopy.

FIG. 7 shows in more detail the lighting unit 23. The lighting unit 23 comprises a water-tight casing 19 and a heatsink 20 that is fastened to the water-tight casing 19.

The water-tight casing 19 comprises orifices. One of the orifices is able to receive an electrical power cable 15 and to retain it in a water-tight manner using a cable gland 16 and an O-ring 17. Another orifice is able to receive the sleeve 8 and to retain it in a water-tight manner using a cable gland 16 and an O-ring 17.

The water-tight casing 19 furthermore comprises a light-emitting diode (LED) 18 placed so as to illuminate in the direction of the sleeve 8.

Inside the water-tight casing 19, the power cable is electrically connected to the LED 18 in order to supply it with electrical power.

The casing 23 furthermore comprises an optical lens (not shown) between the LED 18 and the sleeve 8. The optical lens concentrates the light emitted by the LED 18 onto the second ends of the diffusing optical fibers 4 inside the sleeve 8.

The heatsink 20 allows the temperature of the lighting unit 23 to be regulated by dissipating the heat emitted by the LED 18.

Such coverage-providing articles may be used in various outdoor applications, for example in the water-sports field to produce items of nautical upholstery, in particular cockpit spray hoods, blinds, cockpit roofs, fly bridges, exterior protective covers, tarpaulins, cockpit upholstery (for example bench seats, cushions, sun pads, foam coverings, console coverings or bolster, for example bolster-seat, coverings) sailsmainsail covers, Genoa covers, spinnaker covers, mainsail bags, lazy bags, sun awnings, etc.

Although the invention has been described with reference to a plurality of particular embodiments, it is obvious that it is in no way limited thereto and that it includes all the technical equivalents of the described means and their combinations if the latter fall within the scope of the invention. In particular, the detailed description of FIGS. 1 to 3 may also apply to a fly bridge comprising a roof segment 200 not forming a cockpit but a simple roof above a bridge of a boat.

The use of the verb "to comprise", "to include" or "to encompass" and the conjugated forms thereof does not exclude the presence of other elements or other steps than those defined in a claim.

In the claims, any reference sign between parentheses should not be interpreted as a limitation of the claim.

The invention claimed is:

1. A flexible coverage-providing article (1, 11) for outside use, comprising:
    a covering textile layer (2, 22), and
    a woven illuminating layer (3) comprising diffusing optical fibers (4) and binding threads (5) woven with the diffusing optical fibers (4), the illuminating layer furthermore comprising a border (6) composed of woven textile threads, the border (6) being placed on the perimeter of the woven illuminating layer (3), the diffusing optical fibers (4) extending beyond one edge of the woven illuminating layer (3), an end segment of the diffusing optical fibers (4) being formed into a strand (7),
    an assembly seam (9), the woven illuminating layer (3) being fastened to the covering textile layer (2, 22) by the assembly seam (9) on the border (6), the two layers being taut,
    a lighting unit (23), the lighting unit comprising an optical output, the optical output being connected to the strand (7) of diffusing optical fibers (4), and a light source (18) for generating a light flux in the optical output.

2. The flexible coverage-providing article (1, 11) as claimed in claim 1, wherein the diffusing optical fibers (4) are parallel to one another, so that the woven illuminating layer (3) is substantially flat.

3. The flexible coverage-providing article (1, 11) as claimed in claim 1, furthermore comprising a sleeve (8), the strand (7) being assembled in the sleeve (8) at the end of the strand (7), the sleeve (8) being able to receive the light flux generated in the optical output on the end of the diffusing optical fibers (4).

4. The flexible coverage-providing article (1, 11) as claimed in claim 1, wherein the light source is a light-emitting diode (LED) and the lighting unit furthermore comprises a lens able to focus the light emitted by the LED onto the end of the diffusing optical fibers.

5. The flexible coverage-providing article (1, 11) as claimed in claim 1, wherein the covering textile layer (2) is coated on one face so as to be water resistant, the woven illuminating layer (3) being sewn to the other face.

6. The flexible coverage-providing article (1, 11) as claimed in claim 5, wherein the coating comprises a water-resistant resin.

7. The flexible coverage-providing article (1, 11) as claimed in claim 1, configured in the form of an illuminating spray-hood canvas furthermore comprising sheaths (25) formed along the edges of the covering textile layer (2, 22), the sheaths (25) being able to receive poles in order that the flexible coverage-providing article (1, 11) forms a cockpit or a roof.

8. The flexible coverage-providing article (1, 11) as claimed in claim 1, wherein the covering textile layer is a first covering textile layer (22), the flexible coverage-providing article furthermore comprising a second covering textile layer (21) placed thereabove.

9. The flexible coverage-providing article (1, 11) as claimed in claim 8, wherein the first textile layer (22) contains an aperture of same size as the woven illuminating layer (3) and the edges (12) of this aperture are sewn with the borders (9) of the woven illuminating layer (3) to the first textile layer (22).

10. A spray hood intended for use on a marine vehicle (13), comprising the flexible coverage-providing article (1, 11) as claimed in claim 7 and poles placed at least partially in the sheaths (25) of the flexible coverage-providing article (1, 11), so that the flexible coverage-providing article (1, 11) is taut on the poles, the poles being able to be fastened to the marine vehicle (13).

* * * * *